United States Patent
Kawachi et al.

(10) Patent No.: US 10,862,304 B2
(45) Date of Patent: Dec. 8, 2020

(54) REACTIVE POWER CONTROL DEVICE AND REACTIVE POWER CONTROL METHOD

(71) Applicants: Kabushiki Kaisha Toshiba, Minato-ku (JP); Toshiba Energy Systems & Solutions Corporation, Kawasaki (JP)

(72) Inventors: Shunsuke Kawachi, Tama (JP); Mami Mizutani, Hachioji (JP); Tsutomu Tanno, Fuchu (JP); Tatsuya Hashimoto, Kawasaki (JP)

(73) Assignees: Kabushiki Kaisha Toshiba, Minato-ku (JP); Toshiba Energy Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/426,559

(22) Filed: May 30, 2019

(65) Prior Publication Data
US 2019/0296551 A1 Sep. 26, 2019

Related U.S. Application Data

(63) Continuation of application No. PCT/JP2017/000237, filed on Jan. 6, 2017.

(51) Int. Cl.
*G05F 1/70* (2006.01)
*H02J 3/18* (2006.01)
*H02J 3/16* (2006.01)

(52) U.S. Cl.
CPC .............. *H02J 3/18* (2013.01); *G05F 1/70* (2013.01); *H02J 3/16* (2013.01); *H02J 3/1842* (2013.01); *Y02E 40/30* (2013.01)

(58) Field of Classification Search
CPC ... G05F 1/70; H02J 3/18; H02J 3/1842; H02J 3/16
See application file for complete search history.

(56) References Cited

U.S. PATENT DOCUMENTS

| | | |
|---|---|---|
| 2006/0043941 A1 | 3/2006 | Fujii et al. |
| 2009/0128100 A1 | 5/2009 | Yasuda et al. |
| 2010/0134076 A1 | 6/2010 | Cardinal et al. |
| 2011/0254517 A1 | 10/2011 | Morishima et al. |
| 2013/0234696 A1* | 9/2013 | Bryson ............... G06F 1/26 323/340 |
| 2015/0005979 A1* | 1/2015 | Itaya ............... H02J 3/16 700/298 |

(Continued)

FOREIGN PATENT DOCUMENTS

| | | |
|---|---|---|
| JP | 63-43975 | 9/1988 |
| JP | 4-96624 | 3/1992 |

(Continued)

*Primary Examiner* — Harry R Behm
(74) *Attorney, Agent, or Firm* — Oblon, McClelland, Maier & Neustadt, L.L.P.

(57) ABSTRACT

A reactive power control device includes a limit value deriver configured to derive a limit value of reactive power, which is output by one or a plurality of power conversion devices determined for system stabilization and control of a system voltage, on the basis of a voltage of a point other than a voltage control target, and a command value adjuster configured to adjust a reactive power command value for the one or plurality of power conversion devices on the basis of the limit value derived by the limit value deriver.

5 Claims, 12 Drawing Sheets

(56) References Cited

U.S. PATENT DOCUMENTS

2015/0069978 A1\* 3/2015 Watanabe ................ H02J 3/16
　　　　　　　　　　　　　　　　　　　　　　　　　323/205
2015/0077068 A1　3/2015 Naoi et al.
2016/0237990 A1\* 8/2016 Ubben ................ H02J 3/1885
2017/0133849 A1\* 5/2017 Feng ........................ G05F 1/70

FOREIGN PATENT DOCUMENTS

| JP | 4-313108 | 11/1992 |
| JP | 9-201072 | 7/1997 |
| JP | 2000-132252 | 5/2000 |
| JP | 2006-67722 | 3/2006 |
| JP | 2012-29433 | 2/2012 |
| JP | 2015-61331 | 3/2015 |

\* cited by examiner

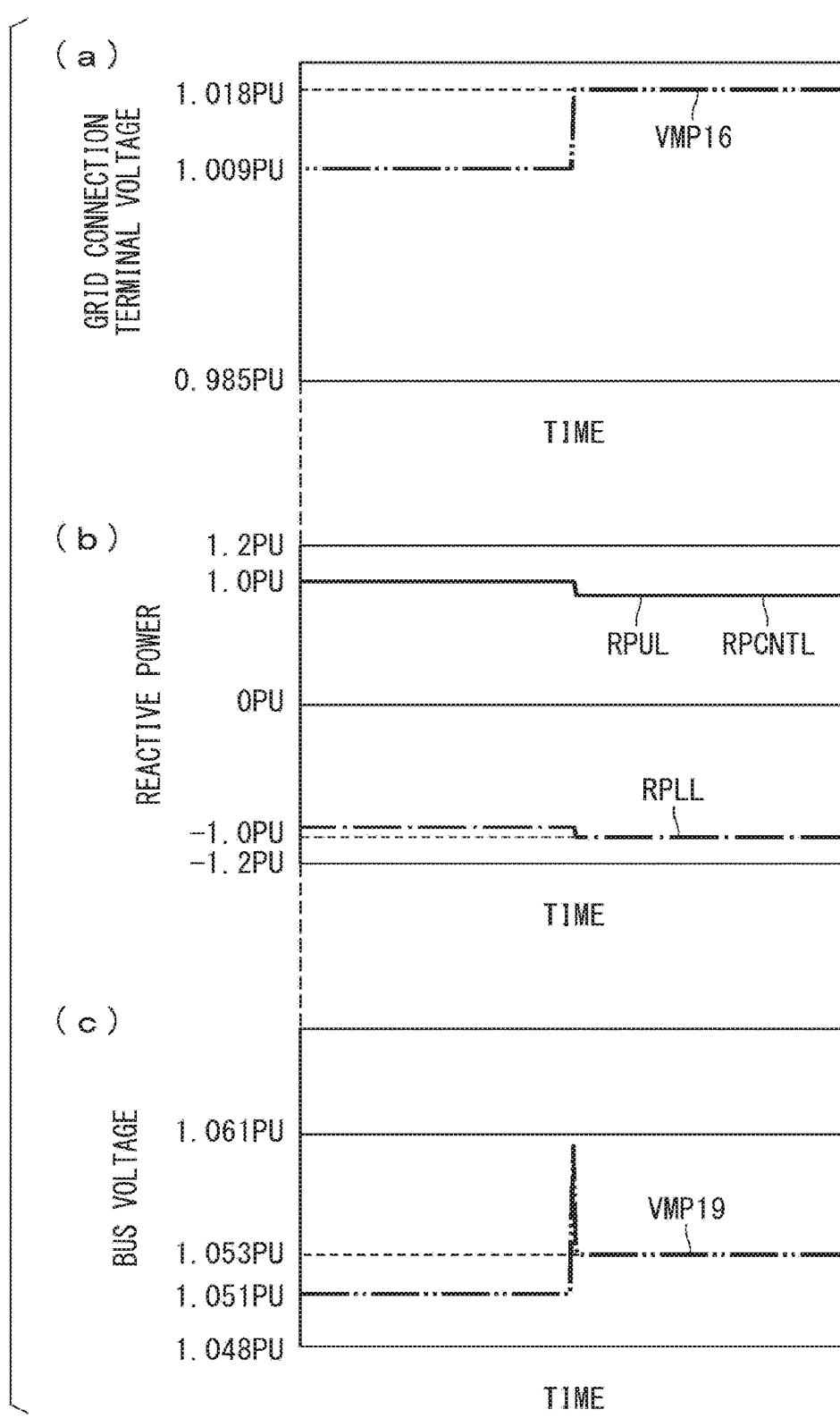

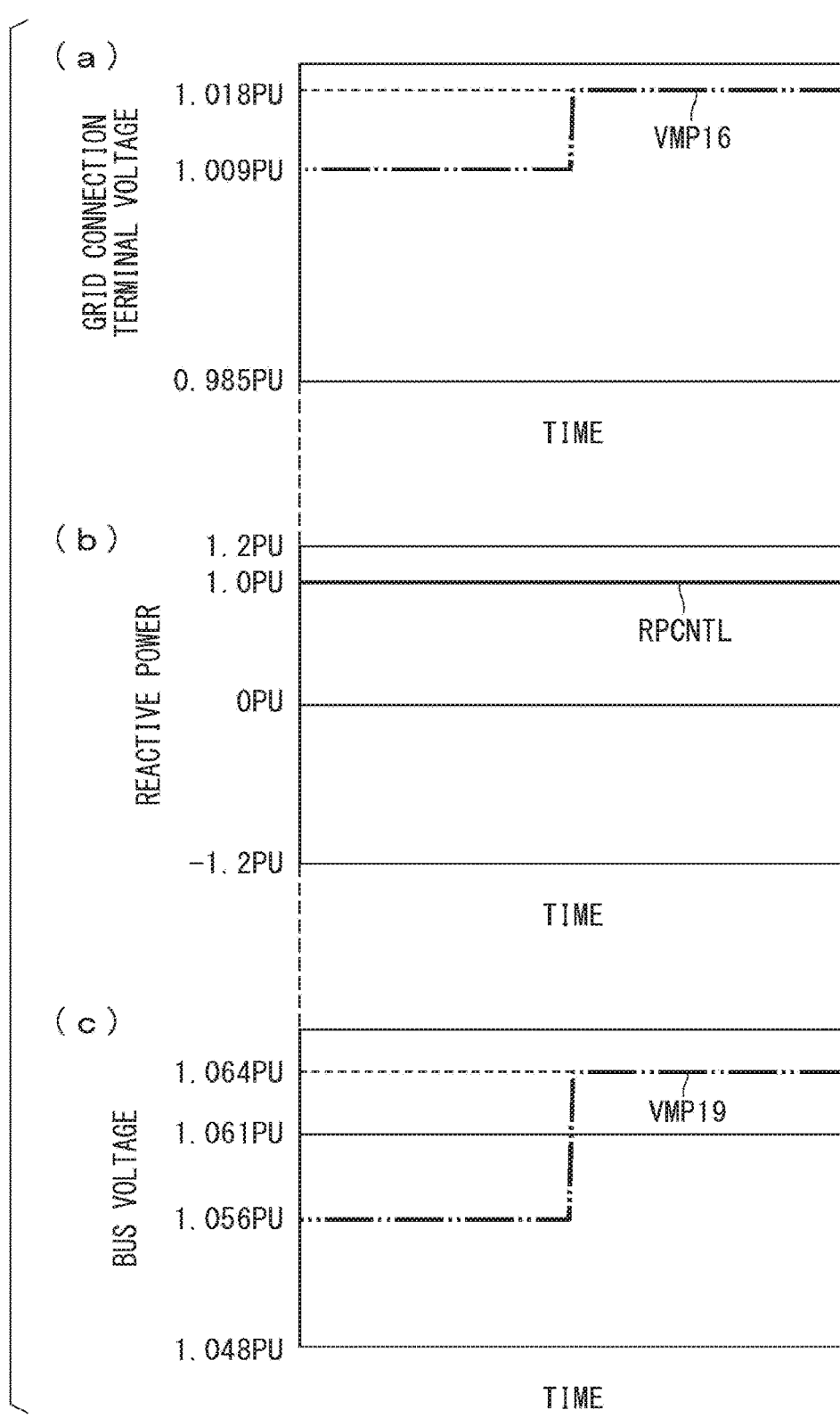

REACTIVE POWER CONTROL DEVICE AND REACTIVE POWER CONTROL METHOD

CROSS-REFERENCE TO RELATED APPLICATION

This application is based upon and claims the benefit of priority from PCT/JP2017/000237 filed on Jan. 6, 2017; the entire contents of which are incorporated herein by reference.

FIELD

Embodiments described herein relate generally to a reactive power control device and a reactive power control method.

BACKGROUND

There has been known a reactive power control device that connects to a power system (a commercial system) and controls reactive power. There is a reactive power control device that cooperatively controls an active power command value and a reactive power command value and adjusts synthesized output so as not to exceed the rated capacity of a power conversion device. However, even though the synthesized output from the power conversion device is adjusted so as not to exceed the rated capacity, since an output terminal voltage of the power conversion device fluctuates due to fluctuation and the like of the impedance of the power system side, a voltage may not be suppressed within an allowable range.

BRIEF DESCRIPTION OF DRAWINGS

FIG. 12 is a diagram illustrating an example of a voltage control result of an embodiment.

FIG. 13 is a diagram illustrating an example of a voltage control result of a comparative example.

DETAILED DESCRIPTION

Figure 1:
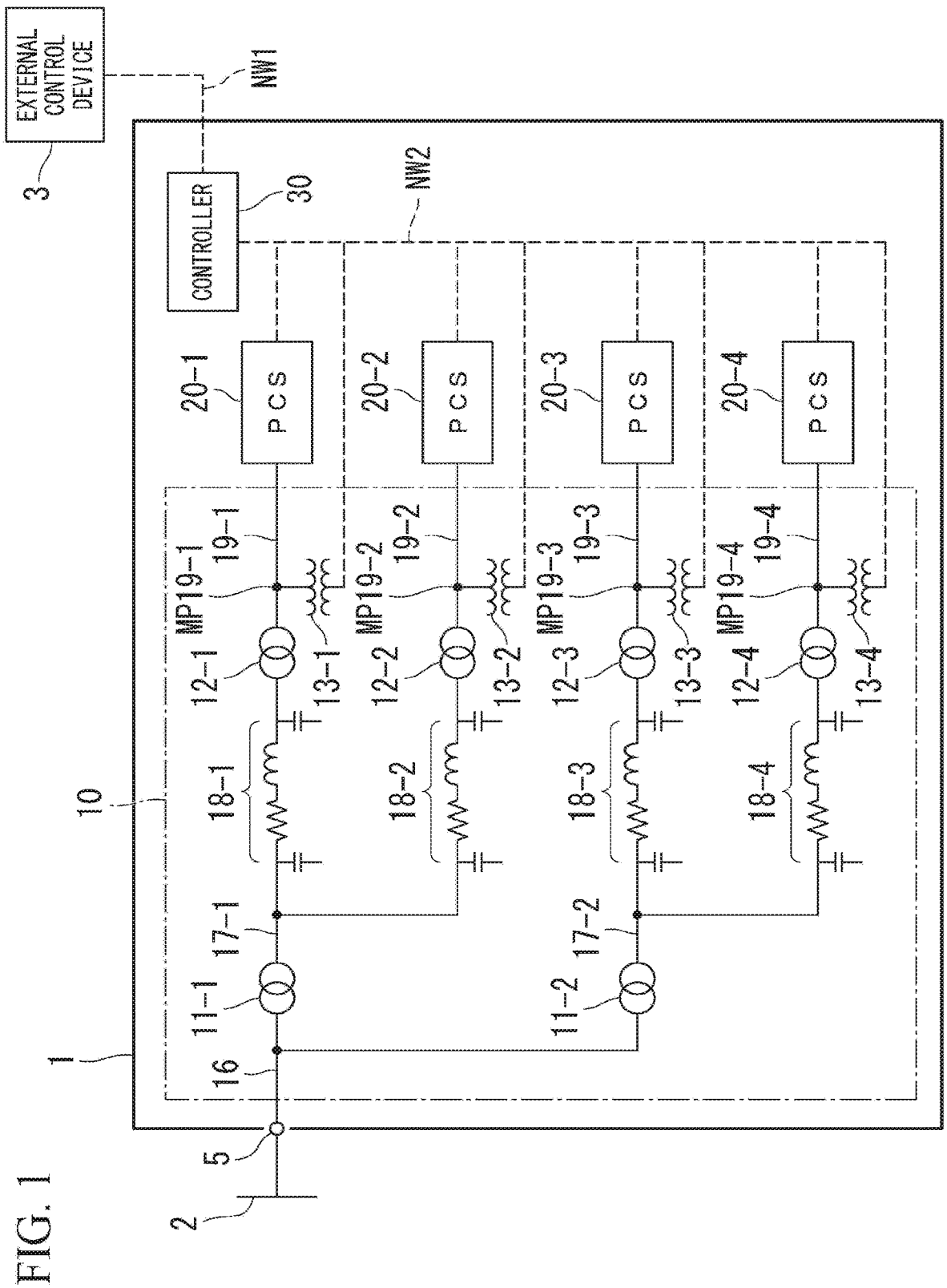
FIG. 1 is a configuration diagram of a reactive power control device according to a first embodiment.

Hereinafter, a reactive power control device and a reactive power control method of embodiments will be described with reference to the drawings. In the following description, elements having the same or similar functions are denoted by the same reference numerals. Furthermore, there are cases where redundant description of these elements will be omitted.

First Embodiment

FIG. 1 is a configuration diagram of a reactive power control device 1 according to the embodiment.

The reactive power control device 1 is connected to a commercial grid 2, which supplies power generated by a power plant to a consumer, at a grid connection point 5. The reactive power control device 1 generates reactive power on the basis of a command value from an external control device 3 connected via a communication line NW1, and supplies the reactive power to a local system 10 in the reactive power control device 1. For example, the command value from the external control device 3 is determined on a scheduled basis based on the state of the commercial grid 2 or a periodical change in the state. The reactive power control device 1 adjusts the reactive power according to the command value from the external control device 3 and in accordance with a change and the like in the impedance or the voltage of the commercial grid 2 which is not controllable by the command value. Hereinafter, the adjustment of the reactive power will be described.

The reactive power control device 1 illustrated in FIG. 1 includes the local system 10, PCSs 20-1 to 20-4, and a controller 30. When the PCSs 20-1 to 20-4 are collectively indicated, they may be called PCSs 20.

The local system 10 is provided between the commercial grid 2 of an interconnection destination and the PCSs 20 connected to the commercial grid 2, and connects the commercial grid 2 and the PCSs 20 to each other. The local system 10 has buses corresponding to a plurality of voltage classes and a plurality of transformers connected between the buses of the plurality of voltage classes from the commercial grid 2 to the PCSs 20. For example, the local system 10 has transformers 11-1 and 11-2 and transformers 12-1 to 12-4 as the plurality of transformers. The local system 10 has a bus 16, buses 17-1 and 17-2, premises wirings 18-1 to 18-4, and buses 19-1 to 19-4 as the buses of the plurality of voltage classes. Hereinafter, the buses 17-1 and 17-2 are called buses 17 when they are collectively indicated, the premises wirings 18-1 to 18-4 are called premises wirings 18 when they are collectively indicated, and the buses 19-1 to 19-4 are called buses 19 when they are collectively indicated. For example, in the following description of the embodiments, it is assumed that the voltage class of the bus 16 is 66 kV (kilovolts), the voltage class of the bus 17 and the premises wiring 18 is 6.6 kV, and the voltage class of the bus 19 is 300 V (volts).

Primary sides of the transformers 11-1 and 11-2 are respectively connected to the bus 16, and for example, the transformers 11-1 and 11-2 step down (convert) a nominal voltage (66 kV) of the commercial grid 2 to a nominal voltage (6.6 kV) of the bus 17, respectively. Furthermore, the transformer 11 boosts (converts) the nominal voltage of the bus 17 to the nominal voltage of the commercial grid 2.

For example, a secondary side of the transformer 11-1 is connected to the bus 17-1. The bus 17-1 branches into the premises wiring 18-1 and the premises wiring 18-2. A primary side of the transformer 12-1 is connected to the premises wiring 18-1, and for example, the transformer 12-1 converts a nominal voltage (6.6 kV) of the premises wiring 18 to a nominal voltage (300 V) of the bus 19. Similarly, a secondary side of the transformer 12-1 is connected to an output terminal of the PCS 20-1 via the bus 19-1. A primary side of the transformer 12-2 is connected to the premises wiring 18-2, and for example, the transformer 12-2 converts 6.6 kV to 300 V. A secondary side of the transformer 12-2 is connected to an output terminal of the PCS 20-2 via the bus 19-2.

Furthermore, a secondary side of the transformer 11-2 is connected to the bus 17-2. The bus 17-2 is branched into the premises wiring 18-3 and the premises wiring 18-4. A primary side of the transformer 12-3 is connected to the premises wiring 18-3, and a secondary side of the transformer 12-3 is connected to an output terminal of the PCS 20-3 via the bus 19-3. A primary side of the transformer 12-4 is connected to the premises wiring 18-4, and a secondary side of the transformer 12-4 is connected to an output terminal of the PCS 20-4 via the bus 19-4.

In the premises wiring 18-1 illustrated in FIG. 1, characteristics of the line (the wiring) are represented by an equivalent circuit (a it type model) based on a concentrated constant. This also applies to the premises wirings 18-2 to 18-4.

The local system 10 of the reactive power control device 1 is connected to the commercial grid 2 with a voltage class of 66 kV, and is an example of a case where buses with three voltage classes of 66 kV, 6.6 kV, and 300 V exist between the commercial grid 2 and the output terminals of the PCSs 20. In the local system 10, a plurality of (two) transformers with different voltage classes are interposed between the grid connection point 5 and the output terminals of the PCSs 20.

The local system 10 of the present embodiment further includes voltage measurement transformers 13-1 to 13-4. The voltage measurement transformer 13-1 is connected to the bus 19-1 and detects a voltage of a measurement point MP 19-1 on the bus 19-1. The voltage measurement transformer 13-2 is connected to the bus 19-2 and detects a voltage of a measurement point MP 19-2 on the bus 19-2. The voltage measurement transformer 13-3 is connected to the bus 19-3 and detects a voltage of a measurement point MP 19-3 on the bus 19-3. The voltage measurement transformer 13-4 is connected to the bus 19-4 and detects a voltage of a measurement point MP 19-4 on the bus 19-4. When the voltage measurement transformers 13-1 to 13-4 are collectively indicated, they are called voltage measurement transformers 13. When the measurement points MP 19-1 to 19-4 are collectively indicated, they are called measurement points MP 19 (first points).

The controller 30 adjusts reactive power output on the basis of the voltages of the buses 19 measured by the voltage measurement transformers 13, and notifies each PCS 20 of a command value of the reactive power output via a communication line NW2. Each PCS 20 generates and outputs desired reactive power according to the command value of the reactive power output notified from the controller 30. The controller 30 may collect the amount of the reactive power, which is output by each PCS 20, via the communication line NW2.

Figure 2:
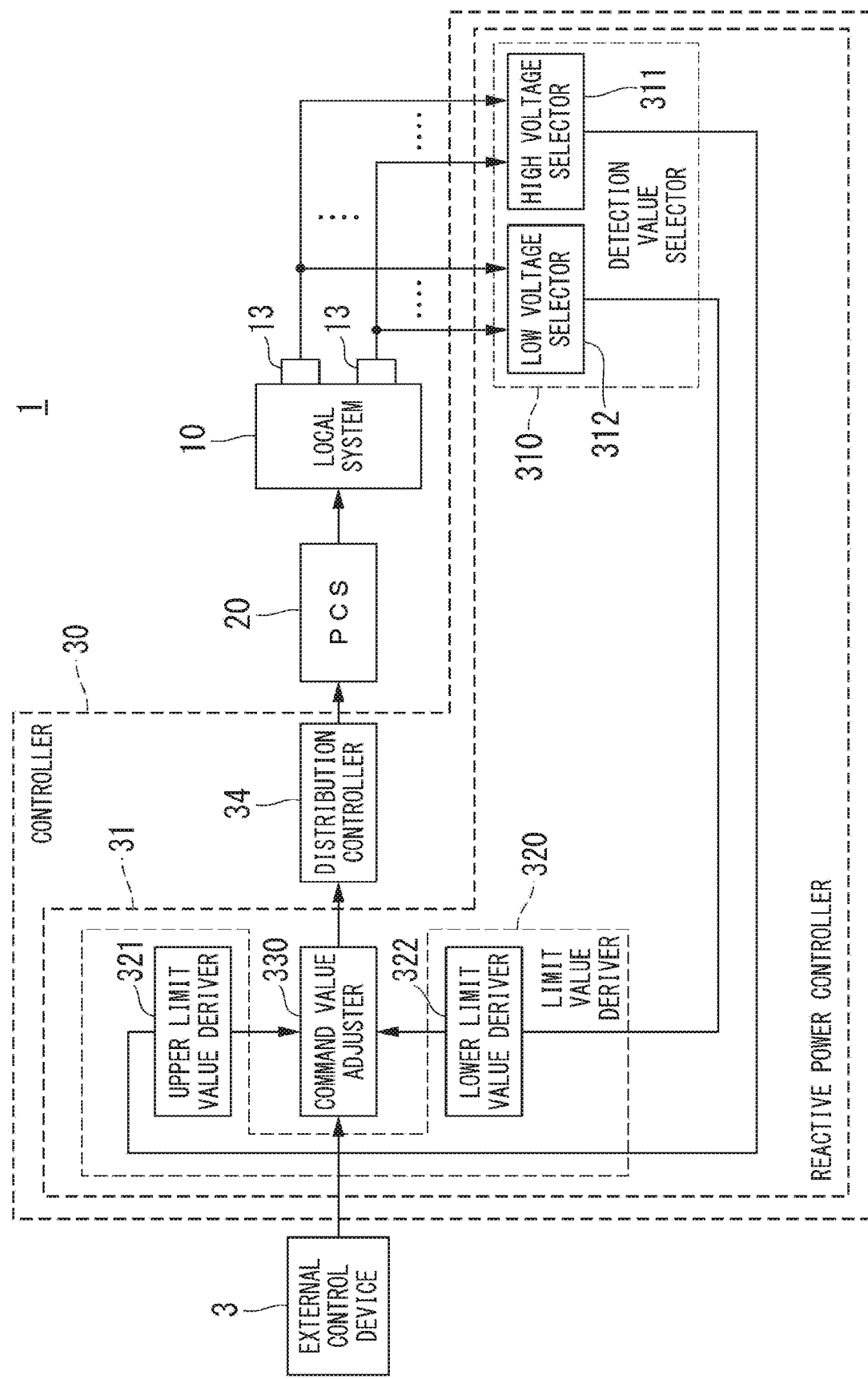
FIG. 2 is a block diagram of a reactive power output adjustment function of a controller in an embodiment.

FIG. 2 illustrates a block diagram of the reactive power output adjustment function of the controller 30 in the embodiment. The controller 30 includes a reactive power controller 31 and a distribution controller 34.

The reactive power controller 31 includes a detection value selector 310, a limit value deriver 320, and a command value adjuster 330.

The detection value selector 310 is connected to the plurality of voltage measurement transformers 13. FIG. 2 illustrates only two signal lines from the voltage measurement transformers 13 for the purpose of convenience, but it is assumed that actually, signals of the voltage measurement values of the buses 19 are received in the detection value selector 310 from the voltage measurement transformers 13 respectively installed on the buses 19.

For example, the detection value selector 310 includes a high voltage selector 311 and a low voltage selector 312. The high voltage selector 311 selects, for example, the highest voltage from the voltages respectively detected by the voltage measurement transformers 13 (voltage detectors) as a desired voltage. The low voltage selector 312 selects, for example, the lowest voltage from the voltages respectively detected by the voltage measurement transformers 13 (the voltage detectors) as a desired voltage. As described above, the detection value selector 310 selects the desired voltages from the voltages respectively detected by the voltage measurement transformers 13 (the voltage detectors) according to prescribed selection rules.

The limit value deriver 320 includes an upper limit value deriver 321 and a lower limit value deriver 322. The upper limit value deriver 321 derives an upper limit value (hereinafter, referred to as a reactive power output upper limit value RPUL-1) of the reactive power output that is output by the PCS 20 from the desired voltage selected by the high voltage selector 311. The lower limit value deriver 322 derives a lower limit value (hereinafter, referred to as a reactive power output lower limit value RPLL-1) of the reactive power output that is output by the PCSs 20 from the desired voltage selected by the low voltage selector 312. The aforementioned reactive power output upper limit value RPUL-1 and reactive power output lower limit value RPLL-1 are an example of the limit value of the reactive power output, but a derivation method of the limit value of the reactive power output is not limited thereto.

That is, the limit value deriver 320 derives the limit value of the reactive power output, which is output by the PCS 20, on the basis of the voltages detected by the voltage measurement transformers 13. For example, the limit value of the reactive power output derived by the limit value deriver 320 may be either or both of the upper limit value and the lower limit value of the voltage range of the output terminal of one or a plurality of PCSs 20, or may include them.

For example, the limit value deriver 320 derives the limit values on the basis of a difference between the voltage values acquired from the voltage measurement transformers 13 and the limit value of an allowable range of a voltage at the output terminal of the PCS 20. For example, the limit value of the allowable range of the voltage at the output terminal of the PCS 20 employs a value, which is determined on the basis of the voltages detected by the voltage measurement transformers 13, as a voltage at the output terminal of one or a plurality of PCSs 20. This value is determined by characterizing the limit of the allowable range of the voltage at the output terminal of the PCS 20.

The command value adjuster 330 adjusts a reactive power command value for the PCS 20 on the basis of the limit value derived by the limit value deriver 320, and suppresses the value of the reactive power command value such that the voltage of the output terminal of the PCS 20 falls within the allowable range.

The distribution controller 34 distributes the reactive power command value for the PCS 20 adjusted by the command value adjuster 330 to the PCSs 20 according to prescribed distribution rules. The distribution controller 34 notifies the PCSs 20 of the distributed reactive power command value. The aforementioned distribution rules may be appropriately selected.

Next, an operation of the reactive power control device 1 will be described.

The controller 30 of the reactive power control device 1 receives a reactive power command value from the external control device 3 via the communication line NW1. The controller 30 controls the PCS 20 to output reactive power according to the command value. In the controller 30, the distribution controller 34 derives a command value of reactive power (a reactive power command value), which is to be output by each PCS 20 constituting the reactive power control device 1, and transmits the reactive power command value to each PCS 20. As a distribution method of the distribution controller 34, various methods are conceived; however, as the simplest case, there is a method of uniformly allocating the reactive power command value to each PCS 20.

When the PCS 20 outputs delayed or advanced reactive power, the voltages of the bus 17-1 and the bus 17-2 and the voltage of the bus 19 are changed by an interaction between the reactive power component (a reactive current) of a current and the impedance of each transformer and the premises wiring 18.

The voltage measurement transformers 13 respectively measure the voltages of the measurement points MP 19 on the buses 19. The detection value selector 310 acquires values of the voltages of the measurement points MP 19 from the voltage measurement transformers 13. For example, the detection value selector 310 selects a maximum voltage value for the reactive power upper limit value and a minimum voltage value for the reactive power lower limit value among the voltages of the buses 19 measured at a plurality of measurement points MP 19. The detection value selector 310 transmits the selected values to the upper limit value deriver 321 and the lower limit value deriver 322.

The upper limit value deriver 321 controls the reactive power upper limit value to be lowered from a current value when the voltage value acquired from the detection value selector 310 exceeds an upper limit value of an allowable voltage value. The control of the upper limit value deriver 321 for adjusting the reactive power output is regarded as feedback control based on the measurement values of the voltages of the measurement points MP 19. The upper limit value deriver 321 may derive the reactive power upper limit value RPUL-1 by performing proportional-integral (PI) control and the like in which a difference between the detection values of the voltages of the measurement points MP 19 and the upper limit value of the voltages is employed as input. For example, the reactive power upper limit value RPUL-1 is an upper limit value of an allowable range of reactive power at the output terminal of one or a plurality of PCSs 20. So far, the arithmetic calculation related to the reactive power upper limit value has been described; however, for the reactive power lower limit value RPLL-1, the operation by the lower limit value deriver 322 is similar to that in the case of the upper limit value deriver 321. For example, the reactive power lower limit value RPLL-1 is a lower limit value of the allowable range of the reactive power at the output terminal of one or a plurality of PCSs 20.

The command value adjuster 330 suppresses the reactive power command value such that the command value of the reactive power falls between the reactive power upper limit value RPUL-1 and the reactive power lower limit value RPLL-1.

The distribution controller 34 distributes the restricted reactive power command value suppressed in the command value adjuster 330 to each PCS 20.

When a reactive power control device such as the aforementioned reactive power control device 1 outputs reactive power, the voltage of the bus 19 may be changed by an interaction between the reactive power component of a current and the impedance of the transformer and the premises wiring 18. For example, as a cause of the change, there are a case, in which the voltage of the grid connection point 5 is changed due to causes on the commercial grid side, and the like.

In a reactive power control device of a comparative example, when the voltage of the bus 19 is changed by the aforementioned factor, there is a risk of deviating from the allowable range (the allowable voltage range) of the output terminal voltage of the PCS 20. For example, the PCS 20 may have an overvoltage relay or an undervoltage relay (not illustrated). In such a case, the overvoltage relay or the undervoltage relay of the PCS 20 can disconnect the PCS 20 by performing an operation for detecting that the voltage of the bus 19 deviates from the allowable voltage range of the PCS 20. When such a situation occurs, it is difficult to continue an operation of the reactive power control device of the comparative example.

In contrast, according to the reactive power control device 1 of the embodiment, the reactive power output limit value output by one or a plurality of PCSs 20 is derived on the basis of the voltages detected by the voltage measurement transformers 13 and the reactive power command value for one or a plurality of PCSs 20 is adjusted on the basis of the reactive power output limit value derived by the limit value deriver 320, so that it is possible to suppress a change in the output terminal voltage of the PCS 20 to be within the allowable voltage range of the PCS 20. In this way, the stability of the operation of the power conversion device is enhanced.

In addition, according to such a control method of the output terminal voltage of the PCS 20, the output terminal voltage of the PCS 20 is not dynamically controlled and its limit value is adjusted, so that it is possible to indirectly suppress the occurrence of an overvoltage at the output terminal of the PCS 20 independently of control from the external control device 3. In this way, the reactive power control device 1 can suppress the voltage of the bus 19 from deviating from the allowable voltage range of the PCS 20.

In addition, when the reactive power command value received from the external control device 3 deviates from the allowable range of the reactive power output prescribed based on the limit value derived by the limit value deriver, the command value adjuster 330 may limit the reactive power command value to be within the allowable range. In this way, even though the reactive power command value received from the external control device 3 deviates from the allowable range of the reactive power output, the reactive power control device 1 can limit a reactive power command value to be output to be within the allowable range.

In addition, the limit value of the reactive power output derived by the limit value deriver 320 includes any one of the upper limit value and the lower limit value of the allowable range of a voltage at the output terminal of one or a plurality of power conversion devices. That is, the reactive power control device 1 may set the allowable range of the voltage at the output terminal of the power conversion device, which is derived by the limit value deriver 320, to either or both of the upper limit value and the lower limit value.

In addition, the limit value deriver 320 may derive the aforementioned limit values on the basis of a difference between the voltage values acquired from the voltage measurement transformers 13 and the limit value of the allowable range of a voltage at the output terminal of one or a plurality of PCSs 20. For example, when the magnitude of the aforementioned difference is within a predetermined range, the reactive power control device 1 can suppress the occurrence of an overvoltage at the output terminal of the PCS 20 by deriving a limit value.

In addition, the limit value deriver 320 may derive the limit value of the reactive power output, which is output by one or a plurality of PCSs 20, on the basis of the allowable value of the voltages of the buses 16 and 17 and the premises wirings 18 in the reactive power control device 1 or the voltages of the measurement points (the first points) at the output terminals of the reactive power control device 1. In this way, the reactive power control device 1 can easily detect a change in the voltages of the first points and adjust the output of the reactive power on the basis of the detected change. The allowable value of the voltages of the measurement points (the first points) is a voltage value that defines a range in which a change in a voltage at an actual voltage measurement point is allowed. When the allowable range of the reactive power output is defined with a voltage value, the limit value of the allowable range of the reactive power output coincides with the limit value of the allowable range of the voltages at the measurement points (the first points). In addition, the measurement point MP 19 is an example of the "first point" and the "first point" is not limited to the measurement point MP 19.

Furthermore, according to the embodiment, since the controller 30 has the reactive power output adjustment function realized by the aforementioned each element, when the voltage of the bus 19 has excessively changed, the reactive power command value transmitted to the PCS 20 is appropriately suppressed such that the voltage falls within the allowable range. In this way, the voltage of the bus 19 remains within the voltage upper limit value, so that the reactive power control device 1 can be continuously operated.

According to the present embodiment, the voltage of the bus 19 is fedback (returned) without depending on device-specific parameters such as the impedance of the transformers 11, the transformers 12, the premises wirings 18 and the like in the reactive power control device 1. Since the reactive power control device 1 adjusts the limit value of the reactive power output by the feedback, even though there is a variation in the device-specific parameters in the reactive power control device 1, it is possible to reliably allow a change in the voltages of the bus 19 and the like to be within an allowable range.

For example, the aforementioned result can be obtained by the processing of the controller 30. Instead of hardware countermeasures for reducing the impedance of the transformers 11, the transformers 12, and each bus constituting the premises wirings 18 which has already been configured, software countermeasures such as the processing of the controller 30 makes it possible to avoid voltage deviation of the bus 19 and operation stop of the reactive power control device 1.

Second Embodiment

A second embodiment will be described. A reactive power control device 1A of the present embodiment is different from the reactive power control device 1 of the first embodiment in that a voltage measurement transformer 15 is provided instead of the voltage measurement transformers 13.

Figure 3:
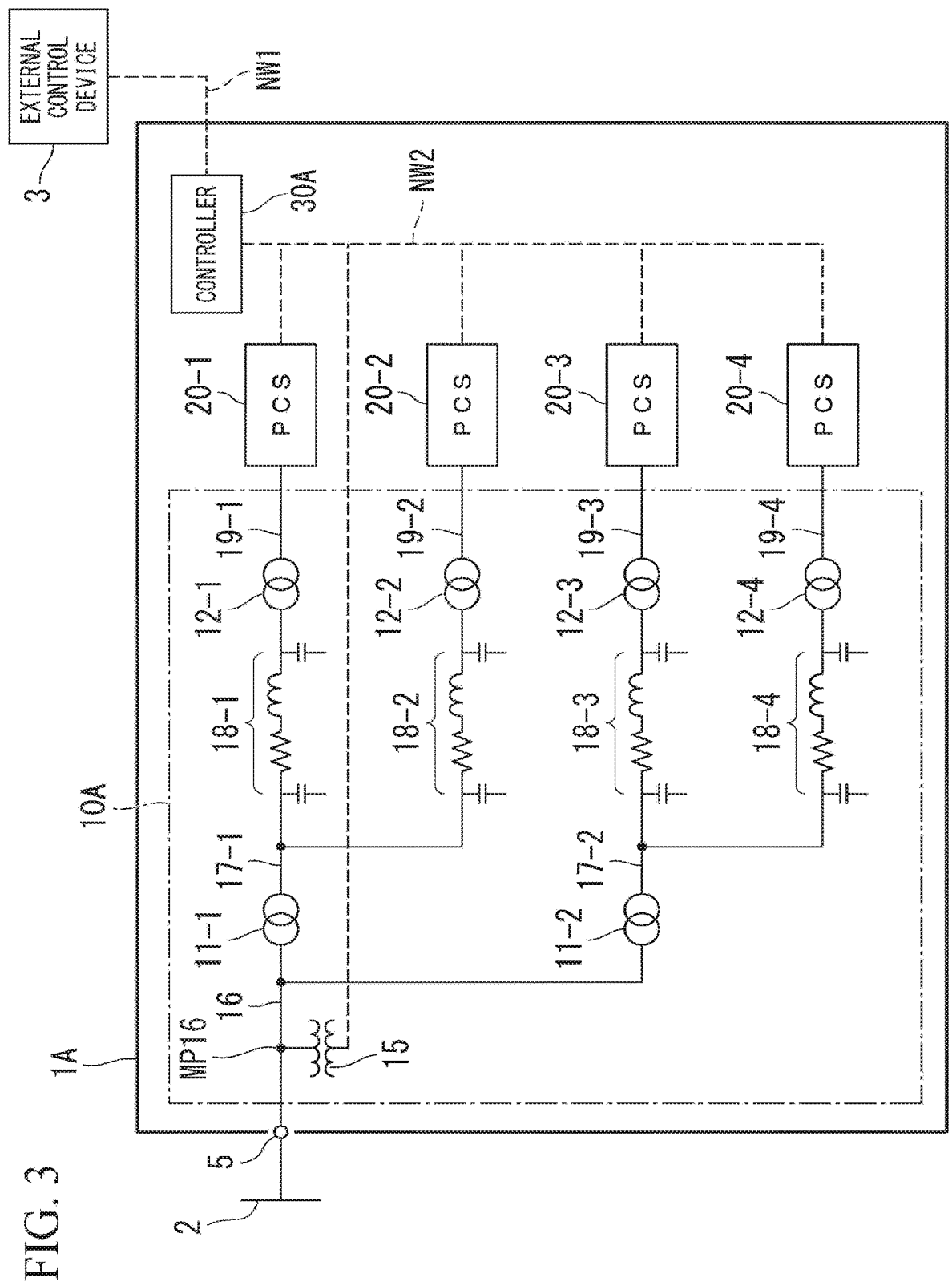
FIG. 3 is a configuration diagram of a reactive power control device according to an embodiment.

FIG. 3 is a configuration diagram of the reactive power control device 1A according to the embodiment.

The reactive power control device 1A includes a local system 10A, the PCSs 20-1 to 20-4, and a controller 30A.

The local system 10A of the present embodiment includes the transformers 11 and 12, the buses 16 to 19, and the voltage measurement transformer 15. The voltage measurement transformer 15 is connected to the bus 16 and detects a voltage of a measurement point MP 16 (a first point) on the bus 16. The voltage of the measurement point MP 16 on the bus 16 corresponds to the voltage of the grid connection point 5. The measurement point MP 16 is an example of the "first point" and the "first point" is not limited to the measurement point MP 16.

The controller 30A adjusts reactive power output by the following method on the basis of the voltage of the bus 16 measured by the voltage measurement transformer 15, and notifies each PCS 20 of a command value of the reactive power output.

Figure 4:
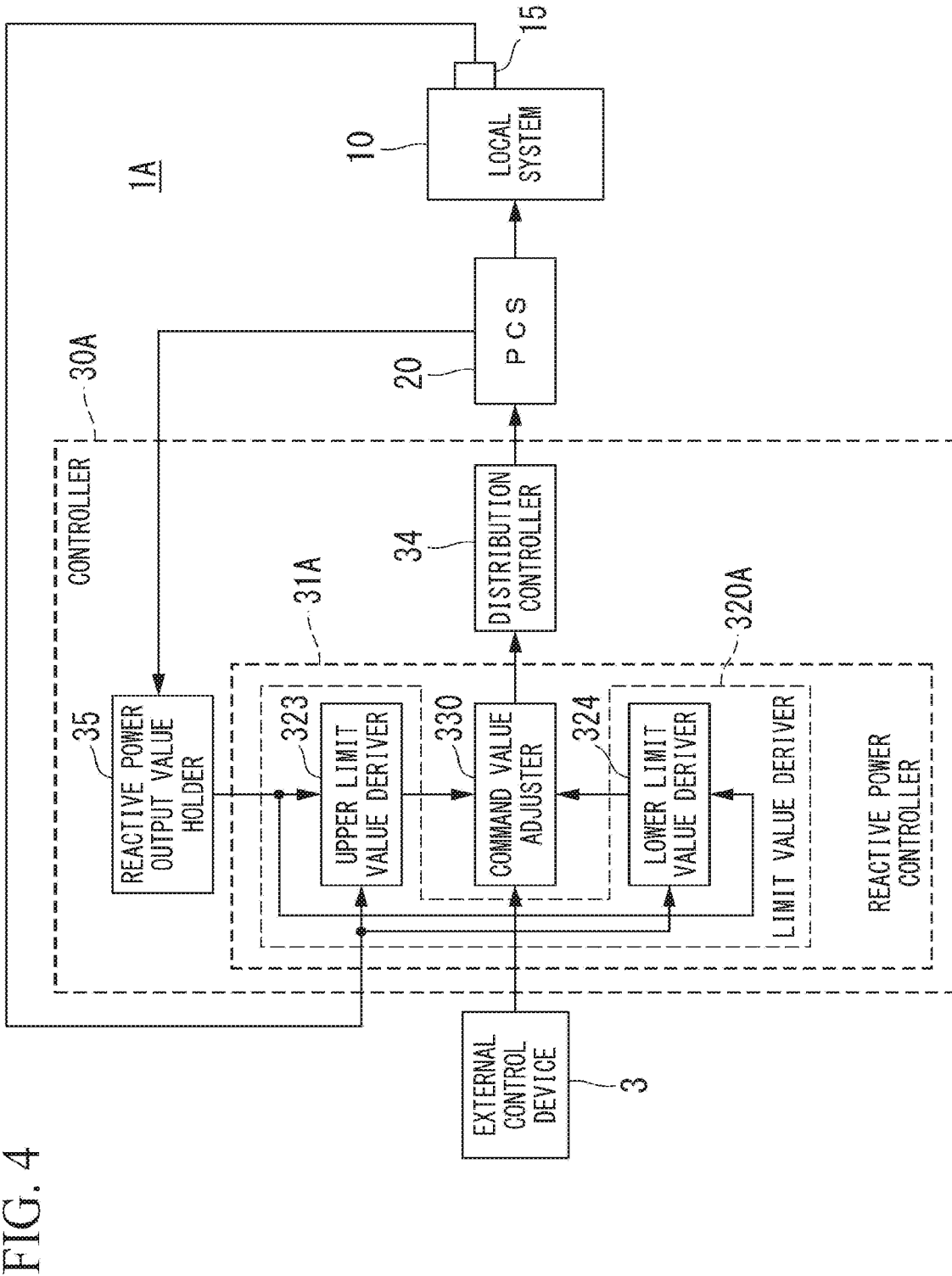
FIG. 4 is a block diagram of a reactive power output adjustment function of a controller in a second embodiment.

FIG. 4 is a block diagram of the reactive power output adjustment function of the controller 30A in the embodiment. The controller 30A includes a reactive power controller 31A, the distribution controller 34, and a reactive power output value holder 35.

The reactive power output value holder 35 holds an output value of reactive power output by the PCS 20. For example, the output value held by the reactive power output value holder 35 may be regularly notified from the PCS 20.

The reactive power controller 31A includes a limit value deriver 320A and the command value adjuster 330.

The limit value deriver 320A includes an upper limit value deriver 323 and a lower limit value deriver 324. The upper limit value deriver 323 derives an upper limit value of the reactive power output that is output by the PCS 20 from the voltage detected by the voltage measurement transformer 15. The lower limit value deriver 324 derives a lower limit value of the reactive power output that is output by the PCS 20 from the voltage detected by the voltage measurement transformer 15.

That is, the limit value deriver 320A derives the limit value of the reactive power output, which is output by the PCS 20, on the basis of the voltage detected by the voltage measurement transformer 15. For example, the limit value of the reactive power output derived by the limit value deriver 320A may be either or both of the upper limit value and the lower limit value of the allowable range of a voltage at the output terminal of one or a plurality of PCSs 20. For example, the limit value deriver 320A may derive the limit value of the reactive power output at the measurement point MP 16 on the basis of a difference between the voltage value acquired from the voltage measurement transformer 15 and the limit value of an allowable voltage range at the measurement point MP 16. For example, the limit value of the allowable voltage range at the measurement point MP 16 employs a value, which is determined on the basis of the voltage detected by the voltage measurement transformer 15, as a voltage at the grid connection point 5. This value is determined by characterizing the limit of the allowable voltage range at the grid connection point 5. The output terminal of the PCS 20 is an example of a "second point" and the "second point" is not limited to the output terminal of the PCS 20.

The command value adjuster 330 adjusts a reactive power command value for the PCS 20 on the basis of the limit value derived by the limit value deriver 320A.

Next, an operation of the reactive power control device 1A will be described.

The upper limit value deriver 323 derives an allowable reactive power upper limit value in a feedforward manner from a current reactive power output value and the voltage value acquired from the voltage measurement transformer 15. The reactive power upper limit value derived by the upper limit value deriver 323 is called a reactive power upper limit value RPUL-2. When deriving the reactive power upper limit value RPUL-2, the upper limit value deriver 323 uses device-specific parameters based on the impedance and the like of the transformer 11, the transformer 12, and the premises wiring 18 in the reactive power control device 1A. For example, the upper limit value deriver 323 may derive a reactive power component of a current flowing through the transformer 11, the transformer 12, and the premises wiring 18 from the current reactive power output value, derive a voltage drop at the transformer 11, the transformer 12, and the premises wiring 18, and derive the reactive power upper limit value RPUL-2 from a result of subtracting an amount of the voltage drop from the voltage of the grid connection point 5.

So far, the arithmetic calculation related to the reactive power upper limit value has been described; however, for the reactive power lower limit value, the operation by the lower limit value deriver 324 is similar to that in the case of the upper limit value. Similarly to the reactive power upper limit value, a reactive power lower limit value derived by the lower limit value deriver 324 is called a reactive power lower limit value RPLL-2.

The command value adjuster 330 adjusts the reactive power command value such that the command value of the reactive power falls between the reactive power upper limit value RPUL-2 and the reactive power lower limit value RPLL-2, thereby suppressing the reactive power command value for the PCS 20.

In the aforementioned first embodiment, a case where the voltage of the bus in the reactive power control device 1 is measured and then the reactive power command value transmitted to the PCS 20 in a feedback manner is suppressed has been introduced; however, voltage overshoot or undershoot may occur due to delay in feedback control.

In contrast, the upper limit value deriver 323 and the lower limit value deriver 324 in the present embodiment adjust the limit value of the reactive power output in a feedforward manner.

According to the aforementioned embodiment, in addition to achieving effects similar to those of the first embodiment, since the voltage of the grid connection point 5 of the reactive power control device 1A is directly detected and the limit value is controlled in a feedforward manner on the basis of the detected voltage, it is possible to reduce a change in a bus voltage even when a reactive power output amount has sharply changed. That is, the reactive power control device 1A can adjust the voltage of the bus without causing voltage overshoot or undershoot due to delay in control.

In addition, as illustrated in FIG. 3, in the present embodiment, the voltage of the bus 16 is measured instead of the bus 19 to which the PCS 20 is directly connected. Even in the case of control based on the voltage of the bus 16, an appropriate margin is given to the voltage upper and lower limit values of the bus 16, so that it is possible to satisfy the allowable voltage range of the bus 19. In this way, as compared with the number of the voltage measurement transformers 13 when the voltage measurement transformers 13 are provided to all of the buses 19, it is possible to reduce the number of the voltage measurement transformers 15.

Third Embodiment

A third embodiment will be described. A reactive power control device 1B of the present embodiment is different from the reactive power control device 1 of the first embodiment in that the controller 30 performs a process for estimating the voltage of the grid connection point 5 (a second point).

Figure 5:
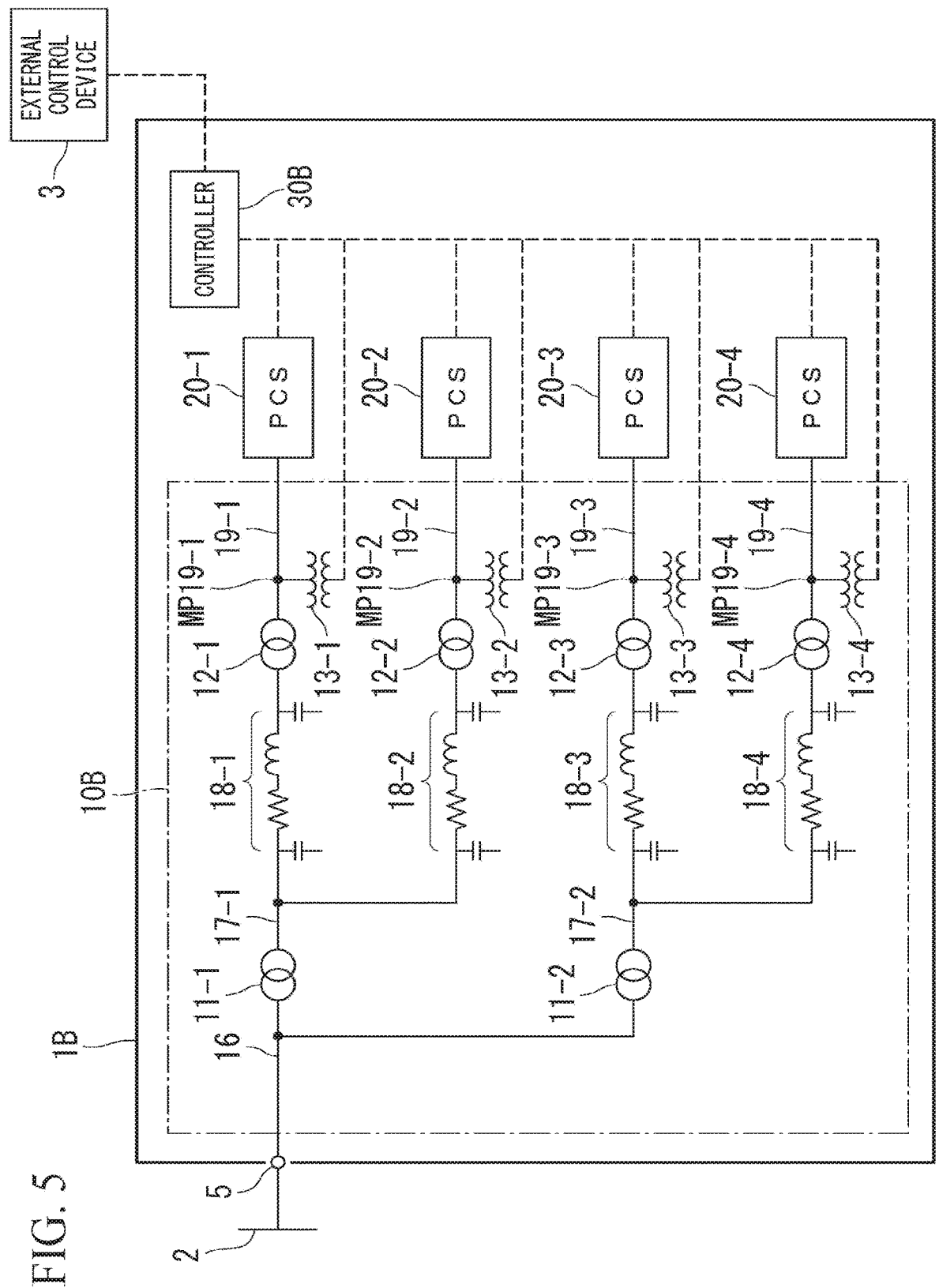
FIG. 5 is a configuration diagram of a reactive power control device according to a third embodiment.

FIG. 5 is a configuration diagram of the reactive power control device 1B according to the embodiment.

The reactive power control device 1B includes the local system 10, the PCSs 20-1 to 20-4, and the controller 30B.

The controller 30B estimates the voltage of the grid connection point 5 on the basis of the voltages (the measurement points MP 19, the first point) of the buses 19 respectively measured by the voltage measurement transformers 13, and generates a command value of reactive power output on the basis of the estimated value of the voltage of the grid connection point 5. The controller 30B notifies each PCS 20 of the command value of the reactive power output via the communication line NW2.

Figure 6:
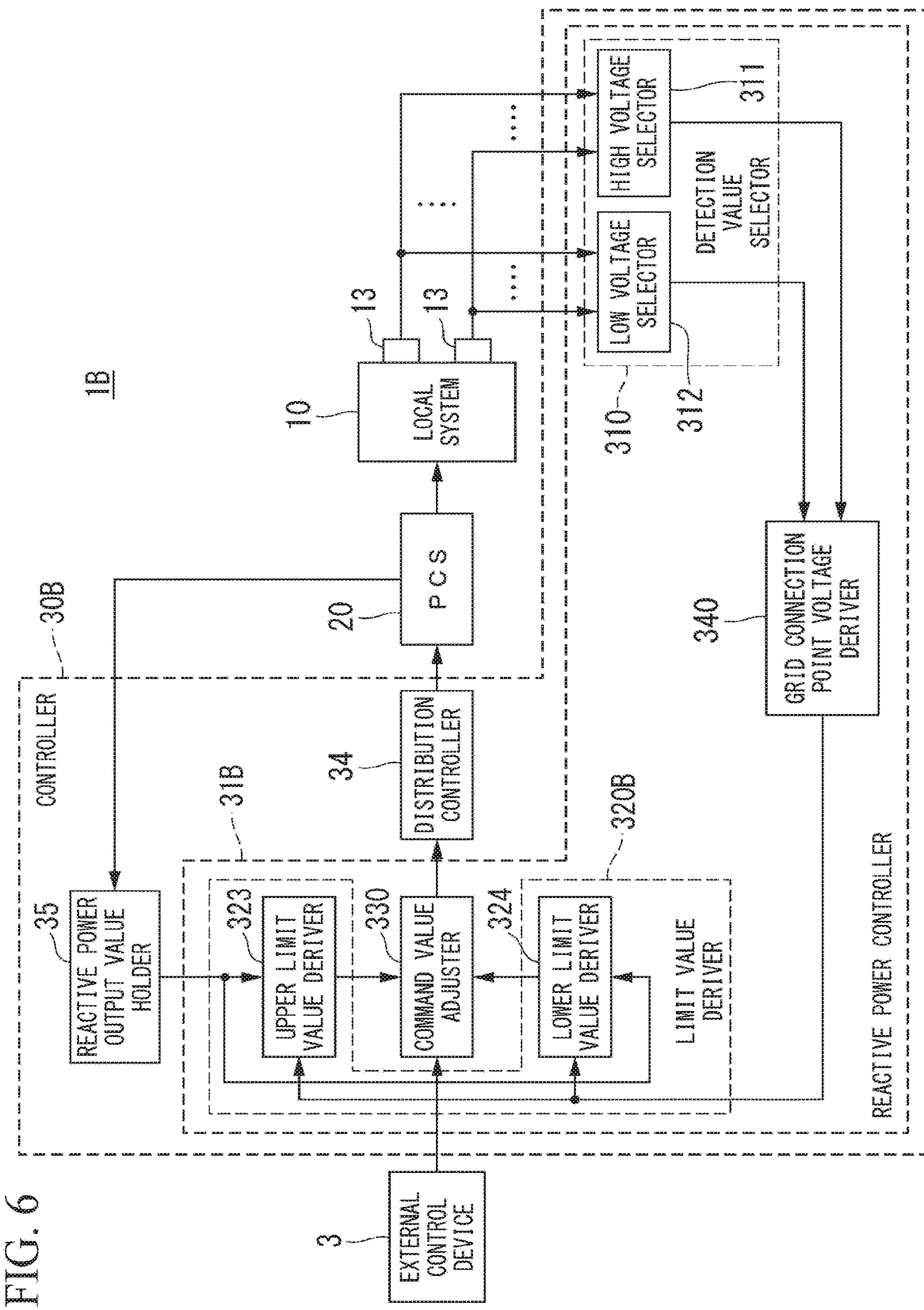
FIG. 6 is a block diagram of a reactive power output adjustment function of a controller in an embodiment.

FIG. 6 is a block diagram of the reactive power output adjustment function of the controller 30B in the embodiment. The controller 30B includes a reactive power controller 31B and the distribution controller 34.

The reactive power controller 31B includes the detection value selector 310, a limit value deriver 320B, the command value adjuster 330, and a grid connection point voltage deriver 340.

The grid connection point voltage deriver 340 derives, for example, the estimated value of the voltage of the grid connection point 5 (a second point) on the basis of a voltage selected by the detection value selector 310. Details of the process for deriving the estimated value of the voltage of the grid connection point 5 will be described later.

The limit value deriver 320B includes an upper limit value deriver 323B and a lower limit value deriver 324B. The upper limit value deriver 323B derives an upper limit value of reactive power output, which is output by the PCS 20, from the estimated value of the voltage of the grid connection point 5 derived by the grid connection point voltage deriver 340. The lower limit value deriver 324B derives a lower limit value of the reactive power output, which is output by the PCS 20, from the estimated value of the voltage of the grid connection point 5 derived by the grid connection point voltage deriver 340.

That is, the limit value deriver 320B derives the limit value of the reactive power output, which is output by the PCS 20, on the basis of the estimated value of the voltage of the grid connection point 5 derived by the grid connection point voltage deriver 340. For example, the limit value of the reactive power output derived by the limit value deriver 320B may be either or both of the upper limit value and the lower limit value of the voltage range allowable by the output terminal of one or a plurality of PCSs 20.

Furthermore, for example, on the basis of a difference between the estimated value of the voltage of the grid connection point 5 derived by the grid connection point voltage deriver 340 and the limit value of an allowable range of a voltage at the measurement point MP 16, the limit value deriver 320B may derive the limit value of the reactive power output at the measurement point MP 16. For example, the limit value of the allowable range of the voltage at the measurement point MP 16 employs a value, which is determined on the basis of the estimated value of the voltage of the grid connection point 5 derived by the grid connection point voltage deriver 340, as a voltage at the grid connection point 5. This value is determined by characterizing the limit of the allowable range of the voltage at the grid connection point 5.

The command value adjuster 330 adjusts a reactive power command value for the PCS 20 on the basis of the limit value derived by the limit value deriver 320B.

Next, the process for deriving the estimated value of the voltage of the grid connection point 5 will be described.

Figure 7:
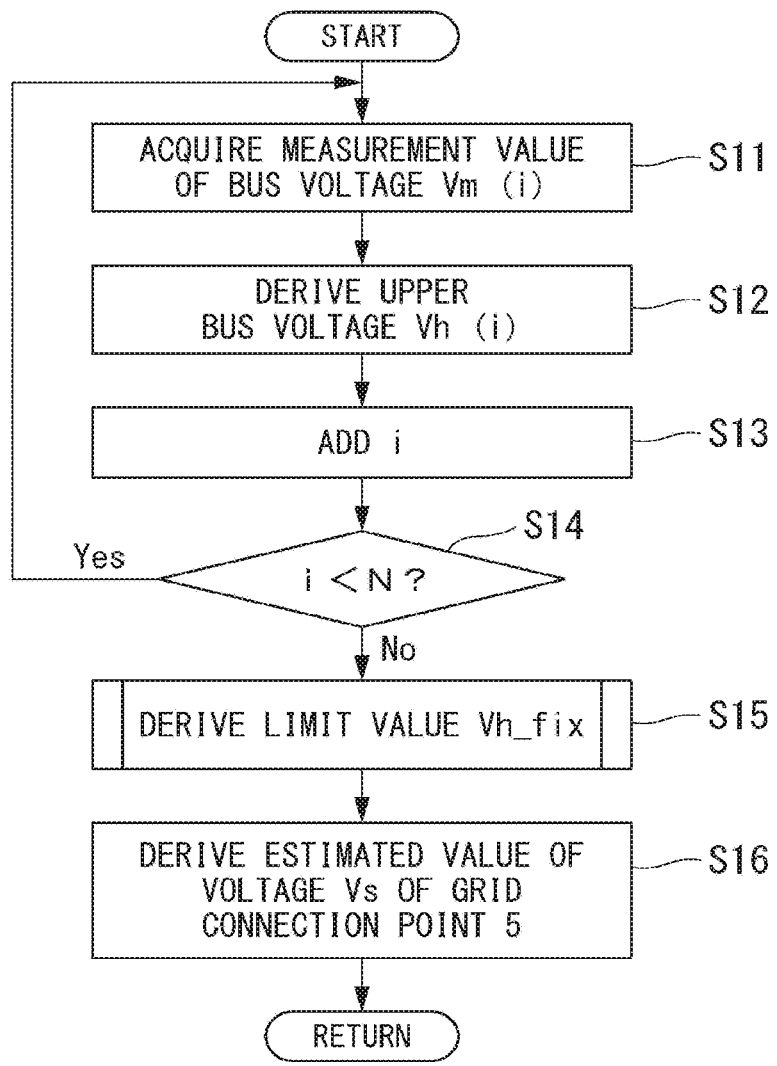
FIG. 7 is a flowchart illustrating a procedure for deriving an estimated value of a voltage of a system connection point in an embodiment.

FIG. 7 is a flowchart illustrating a procedure for deriving the estimated value of the voltage of the grid connection point 5 in the embodiment.

Firstly, the grid connection point voltage deriver 340 acquires a measurement value of a voltage (a bus voltage Vm (i)) at the measurement point MP on a bus (S11). For example, the bus of the present embodiment is the bus 19 to which the PCS 20 is connected. In addition, i has a value that identifies each bus.

On the basis of the acquired bus voltage Vm (i), the grid connection point voltage deriver 340 derives a voltage Vh (i) of a desired point on an upper bus according to Formula (1) below (S12). For example, the desired point on the upper bus may be the grid connection point 5 or a point defined between the grid connection point 5 and the output terminal of the PCS 20.

$$Vh(i)=(1+a)Vm(i)+b \times Qpcs(i)/Vm(i) \quad (1)$$

In Formula (1) above, Vm (i) denotes the bus voltage of the measurement point MP 19 of an $i^{th}$ bus 19, Qpcs (i) denotes the magnitude of reactive power output of the PCS 20 corresponding to the $i^{th}$ bus 19, and a and b denote parameters (coefficients) specific to the reactive power control device 1B. For example, a employs a value corresponding to a value corresponding to a transformation ratio of the nearest transformer 12 and the like. An absolute value of the value is a value in the vicinity of 0 which is 1 or less. Furthermore, b employs a value corresponding to an impedance value to the measurement point MP on the bus and a desired point for deriving the voltage Vh (i). When b is set to the impedance value, the second term of Formula (1) above corresponds to a voltage variation due to reactive power. In addition, in the reactive power Q, a direction in which the voltage of a wiring end (the bus 19) is increased is defined as positive.

Next, the grid connection point voltage deriver 340 updates the value of i by adding 1 to the value of i (S13). The grid connection point voltage deriver 340 determines whether the value of i is smaller than a threshold value N (S14).

When the value of i is smaller than the threshold value N (S14: Yes), the grid connection point voltage deriver 340 repeats the processes from S11. When the value of i is equal to or more than the threshold value N (S14: No), the grid connection point voltage deriver 340 derives a limit value Vh_fix on the basis of the voltage Vh (i) derived in S12 (S15).

Next, the grid connection point voltage deriver 340 derives the estimated value of a voltage Vs of the grid connection point 5 on the basis of the derived limit value, for example, according to Formula (2) below (S16).

$$Vs=(1+c) \times (Vh\_fix)+d \times Qtot/(Vh\_fix) \quad (2)$$

In Formula (2) above, Vh_fix denotes the limit value derived in S15, Qtot denotes the total amount of the reactive power output by the PCS 20, and c and d denote parameters (coefficients) specific to the reactive power control device 1B.

By the above processes, the grid connection point voltage deriver 340 derives the estimated value of the voltage of the grid connection point 5.

Figure 8:
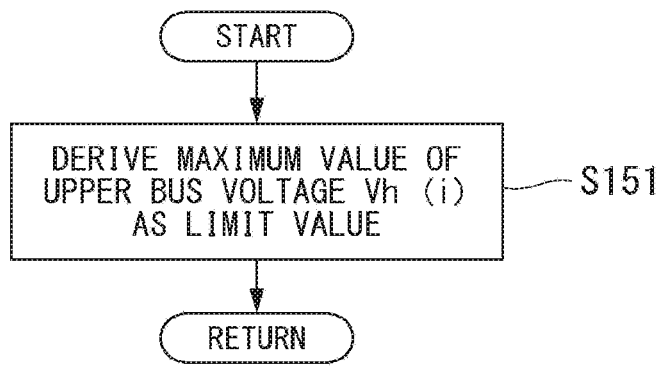
FIG. 8 is a flowchart illustrating a process for deriving a limit value serving as an upper limit value in an embodiment.

FIG. 8 is a flowchart illustrating the process for deriving the limit value Vh_fix serving as an upper limit value in the embodiment. The grid connection point voltage deriver 340 derives the limit value Vh_fix according to Formula (3) below on the basis of the derivation result of the voltage Vh (i) derived based on the bus voltage Vm (i).

$$Vh\_fix=\text{Max}(Vh(i)) \quad (3)$$

For example, as expressed by Formula (3) above, the grid connection point voltage deriver 340 derives a maximum value of the bus voltage Vm (i) and determines the value as the limit value Vh_fix.

Figure 9:
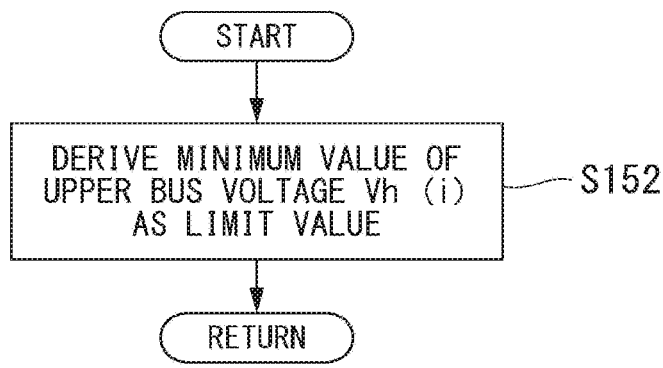
FIG. 9 is a flowchart illustrating a process for deriving a limit value serving as a lower limit value in an embodiment.

FIG. 9 is a flowchart illustrating the process for deriving the limit value Vh_fix serving as a lower limit value in the embodiment. The grid connection point voltage deriver 340 derives the limit value Vh_fix according to Formula (4) below on the basis of the derivation result of the voltage Vh (i) derived based on the bus voltage Vm (i).

$$Vh\_fix=\text{Min}(Vh(i)) \quad (4)$$

For example, as expressed by Formula (4) above, the grid connection point voltage deriver 340, for example, derives a minimum value of the bus voltage Vm (i) and determines the value as the limit value Vh_fix.

Next, an operation of the reactive power control device 1B will be described.

The grid connection point voltage deriver 340 derives (estimates) the voltage of the grid connection point 5 from a current reactive power output value and the value of the voltage of the bus 19, and transmits the voltage value to the upper limit value deriver 323B and the lower limit value deriver 324B. In the estimation process illustrated in FIG. 7, a voltage drop is calculated on the basis of a reactive power component of a current and the impedance of a path and an upper bus voltage is derived by a linear sum of the voltage measurement value of the bus 19 and the voltage drop. For example, the grid connection point voltage deriver 340 derives the reactive power component of the current by dividing the reactive power output value of the PCS 20 by the voltage of the bus 19. By such a process, the grid connection point voltage deriver 340 estimates the voltage of the grid connection point 5 on the assumption that the upper bus voltage can be estimated.

According to the embodiment, in addition to achieving effects similar to those of the first embodiment, the voltage of the grid connection point 5 is not measured by the voltage measurement transformer 15 and is estimated, so that it is possible to perform control based on the voltage of the grid connection point 5 as an estimated value. In this way, the reactive power control device 1B can reduce a change in the voltage of the bus 19.

In addition, since a high voltage class is generally used for the voltage of the grid connection point 5, the number of the voltage measurement transformers 15 can be reduced at this point, so that it is possible to obtain a great effect also in terms of maintenance reduction of facilities.

Fourth Embodiment

A fourth embodiment will be described. A reactive power control device 1C of the present embodiment does not include the voltage measurement transformer 13 differently from the reactive power control device 1 of the first embodiment, and the like. The reactive power control device 1C does not include the voltage measurement transformer 15 differently from the reactive power control device 1B of the second embodiment. The reactive power control device 1C includes voltage measurement transformers 14.

Figure 10:
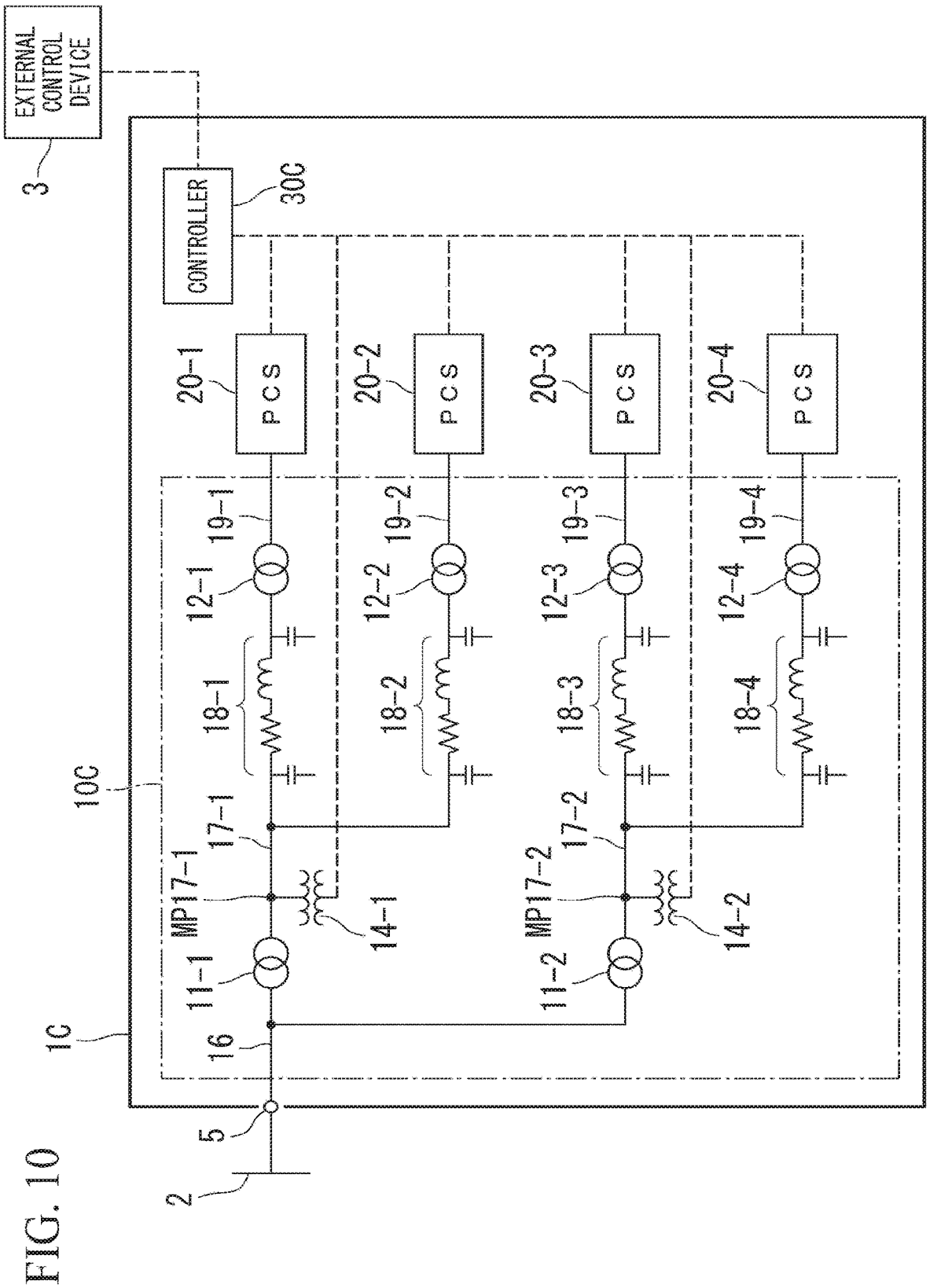
FIG. 10 is a configuration diagram of a reactive power control device according to a fourth embodiment.

FIG. 10 is a configuration diagram of the reactive power control device 1C according to the embodiment.

The reactive power control device 1C includes a local system 10C, the PCSs 20-1 to 20-4, and a controller 30C.

The local system 10C of the present embodiment includes the transformers 11 and 12, the buses 16 to 19, and voltage measurement transformers 14-1 and 14-2. The voltage measurement transformer 14-1 is connected to the bus 17-1 and detects a voltage of a measurement point MP 17-1 (a first point) on the bus 17-1. The voltage measurement transformer 14-2 is connected to the bus 17-2 and detects a voltage of a measurement point MP 17-2 (a first point) on the bus 17-2. When the voltage measurement transformer 14-1 and the voltage measurement transformer 14-2 are collectively indicated, they are called the voltage measurement transformers 14.

The controller 30C adjusts reactive power output on the basis of the voltage of the bus 17 measured by the voltage measurement transformer 14, and notifies each PCS 20 of a command value of the reactive power output.

Figure 11:
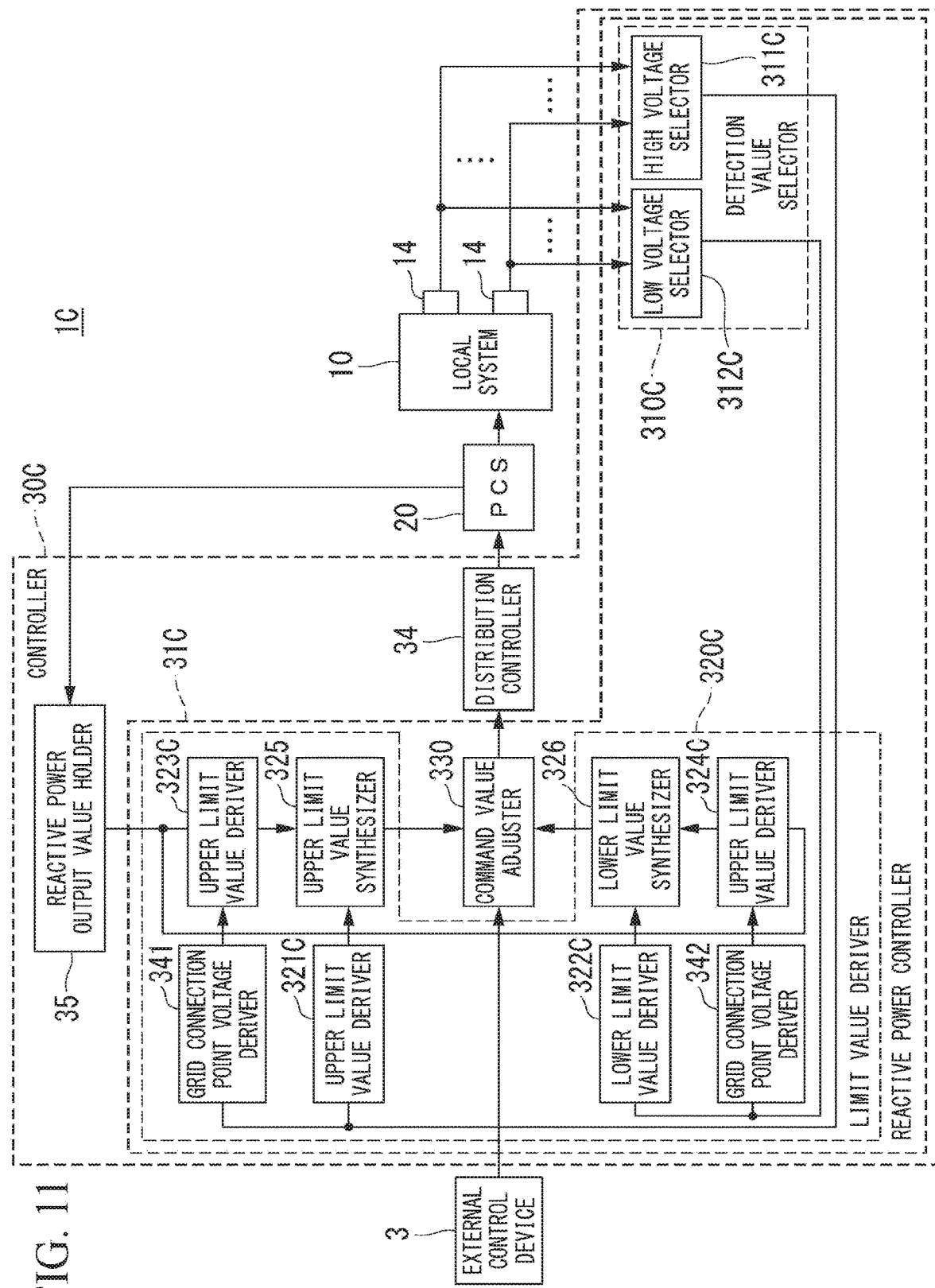
FIG. 11 is a block diagram of a reactive power output adjustment function of a controller in an embodiment.

FIG. 11 is a block diagram of the reactive power output adjustment function of the controller 30C in the embodiment. The controller 30C includes a reactive power controller 31C and the distribution controller 34.

The reactive power controller 31C includes a detection value selector 310C, a limit value deriver 320C, and the command value adjuster 330.

The detection value selector 310C is connected to a plurality of voltage measurement transformers 14. FIG. 11 illustrates only two signal lines from the voltage measurement transformers 14 for the purpose of convenience; however, it is assumed that actually, signals of the voltage measurement values of the buses 17 are received in the detection value selector 310C from the voltage measurement transformers 14 respectively installed on the buses 17.

For example, the detection value selector 310C includes a high voltage selector 311C and a low voltage selector 312C. The high voltage selector 311C selects, for example, the highest voltage from the voltages respectively detected by the voltage measurement transformers 14 (voltage detectors) as a desired voltage. The low voltage selector 312C selects, for example, the lowest voltage from the voltages respectively detected by the voltage measurement transformers 14 (the voltage detectors) as a desired voltage.

As described above, the detection value selector 310C selects the desired voltages from the voltages respectively detected by the voltage measurement transformers 14 (the voltage detectors) according to prescribed selection rules.

The limit value deriver 320C includes an upper limit value deriver 321C, a lower limit value deriver 322C, an upper limit value deriver 323, a lower limit value deriver 324, grid connection point voltage derivers 341 and 342, an upper limit value synthesizer 325, and a lower limit value synthesizer 326.

Firstly, processing on an upper limit value side will be described.

The upper limit value deriver 321C derives a first upper limit value of reactive power output, which is output by the PCS 20C, from the desired voltage selected by the high voltage selector 311C. The grid connection point voltage deriver 341 derives the estimated value of the voltage of the grid connection point 5 on the upper limit value side on the basis of the voltage selected by the high voltage selector 311C. The arithmetic calculation of the grid connection point voltage deriver 341 is equivalent to the arithmetic calculation of the aforementioned grid connection point voltage deriver 340. The upper limit value deriver 323C derives a second upper limit value of the reactive power output, which is output by the PCS 20, from the estimated value of the voltage of the grid connection point 5 derived by the grid connection point voltage deriver 341.

The upper limit value synthesizer 325 derives an upper limit value (a reactive power synthesis upper limit value RPUL) of the reactive power output, which is output by the PCS 20, as an upper limit value of the reactive power output, which is output by the PCS 20, on the basis of the first upper limit value derived by the upper limit value deriver 321C and the second upper limit value derived by the upper limit value deriver 323C.

For example, the upper limit value synthesizer 325 may perform a synthesis process for employing an upper limit value higher than the reactive power upper limit value RPUL-1 (the first upper limit value) derived by the upper limit value deriver 321C and the reactive power upper limit value RPUL-2 (the second upper limit value) derived by the upper limit value deriver 323C.

Processing on a lower limit value side is similar to the processing on the upper limit value side.

The lower limit value deriver 322C derives a lower limit value of the reactive power output, which is output by the PCS 20, from the desired voltage selected by the low voltage selector 312C. The grid connection point voltage deriver 342 derives the estimated value of the voltage of the grid connection point 5 on the lower limit value side on the basis of the voltage selected by the low voltage selector 312C. The arithmetic calculation of the grid connection point voltage deriver 342C is equivalent to the arithmetic calculation of the aforementioned grid connection point voltage deriver 340.

The lower limit value deriver 324C derives a second lower limit value of the reactive power output, which is output by the PCS 20, from the estimated value of the voltage of the grid connection point 5 derived by the grid connection point voltage deriver 341.

The lower limit value synthesizer 326 derives a lower limit value (a reactive power synthesis lower limit value RPLL) of the reactive power output, which is output by the PCS 20, as a lower limit value of the reactive power output, which is output by the PCS 20, on the basis of the first lower limit value derived by the lower limit value deriver 322C and the second lower limit value derived by the lower limit value deriver 324C.

For example, the lower limit value synthesizer 326 may perform a synthesis process for employing a lower limit value lower than the reactive power upper limit value RPLL-1 (the first lower limit value) derived by the lower limit value deriver 322C and the reactive power upper limit value RPLL-2 (the second lower limit value) derived by the lower limit value deriver 324C.

The command value adjuster 330 adjusts a reactive power command value for the PCS 20 on the basis of the limit value derived by the limit value deriver 320C.

Next, an operation of the reactive power control device 1C will be described.

The upper limit value synthesizer 325 derives a final reactive power upper limit value (a reactive power synthesis upper limit value RPUL) from the aforementioned reactive power upper limit value RPUL-1 and reactive power upper limit value RPUL-2. For example, in the present embodiment, a lower value priority of absolute values of the reactive power upper limit value RPUL-1 and the reactive power upper limit value RPUL-2 is used.

In addition, the upper limit value synthesizer 325 may derive an average value or a weighted average value of the aforementioned first upper limit value and second upper limit value by a synthesis process.

So far, the arithmetic calculation related to the reactive power upper limit value has been described; however, for the reactive power lower limit value, the operation of the lower limit value synthesizer 326 is similar to that in the case of the upper limit value.

The command value adjuster 330 suppresses the reactive power command value such that the command value of the reactive power falls between the reactive power synthesis upper limit value and the reactive power synthesis lower limit value.

Hereinafter, comparative examples of the present embodiment will be exemplified.

As a first comparative example of the present embodiment, a case where the upper limit value deriver 323C is not provided and only the upper limit value deriver 321C is configured with respect to the control of the reactive power upper limit value will be exemplified. In the first comparative example, there is a problem that voltage overshoot occurs due to control delay.

As a second comparative example of the present embodiment, a case where the upper limit value deriver 321C is not provided and only the upper limit value deriver 323C is configured will be exemplified. In the second comparative example, when there is a variation in parameters in the reactive power control device and a result of identifying the parameters is not accurate, since an error occurs in the derivation of the reactive power upper limit value RPUL-2, the voltage of the output terminal of the PCS 20 may deviate from an allowable range. Furthermore, since the voltage estimation of the grid connection point in the grid connection point voltage deriver 341 also depends on the parameters in the device, an error may occur in the derivation of the reactive power upper limit value RPUL-2 similarly.

In contrast, according to the present embodiment, in addition to achieving effects similar to those of the first embodiment, the upper limit value deriver 321C derives the first upper limit value on the basis of the allowable value of the voltage of the first point on the bus 17 in the reactive power control device 1 (deriver). The upper limit value deriver 321C derives the estimated value of the voltage of the second point on the basis of the voltage of the first point and the reactive power amount of one or a plurality of PCSs 20. The upper limit value deriver 321C derives the second upper limit value on the basis of the estimated value of the voltage of the second point and derives the limit value of each PCS 20 from the first upper limit value or the second upper limit value. In this way, according to the present embodiment, it is possible to avoid the above problems by using two reactive power upper limit value derivers of the upper limit value deriver 321C and the upper limit value deriver 323C in combination with each other, so that it is possible to reliably suppress the deviation of the voltage of the output terminal of the PCS 20. The above is an explanation of the reactive power upper limit value, but the same applies to the reactive power lower limit value. In addition, the grid connection point 5 is an example of the "second point" and the "second point" is not limited to the grid connection point 5.

In addition, as illustrated in FIG. 10, in the present embodiment, the voltage of the bus 17 is measured instead of the bus 19 to which the PCS 20 is directly connected. Even in the case of control based on the voltage of the bus 17, an appropriate margin is given to the voltage upper and lower limit values of the bus 17, so that it is possible to satisfy the allowable voltage range of the bus 19. In this way, as compared with the number of the voltage measurement transformers 13 when the voltage measurement transformers 13 are provided to all of the buses 19, it is possible to reduce the number of the voltage measurement transformers 14.

In addition, in the embodiment, a case where the first point is arranged on the bus 17 has been described; however, the first point may be set in the local system 10 of the reactive power control device 1, or for example, can also be set at the buses 16 and 19, the premises wiring 18, or the output terminal of the PCS 20.

The effects of the reactive power output suppression function will be described using a graph. FIG. 12 is a diagram illustrating an example of a voltage control result of the embodiments. FIG. 12($a$) illustrates a change over time of the voltage of the grid connection point 5, FIG. 12($b$) illustrates a change over time of a reactive power command value, and FIG. 12($c$) illustrates a change over time of the voltage of the bus 19.

Based on the wirings illustrated in FIG. 10, it is assumed that the reactive power control device 1C outputs reactive power in a voltage increasing direction. As illustrated in FIG. 12($a$), it is assumed that the voltage (VMP 16) of the grid connection point 5 of the reactive power control device 1C has changed stepwise. The upper limit value deriver 321C and the upper limit value deriver 323C of the reactive power control device 1C suppress reactive power output to the upper limit value RPUL or the lower limit value RPLL, so that a reactive power command value RPCNTL due to a voltage variation of the aforementioned grid connection point 5 is limited as illustrated in FIG. 12($b$). As a consequence, the reactive power command value RPCNTL is suppressed to an appropriate variation range and is output. Furthermore, as illustrated in FIG. 12($c$), the voltage (VMP 19) of the bus 19 stays below a voltage upper limit value (for example, 1.061 PU). Accordingly, the reactive power control device 1C can be continuously operated.

FIG. 13 is a diagram illustrating an example of a voltage control result of the comparative examples. When the reactive power output suppression control is not performed, a reactive power command value RPCTRL remains at a fixed value as illustrated in FIG. 13($b$). As illustrated in FIG. 13($a$), when a voltage variation similar to that of FIG. 12($a$) occurs in the voltage (VMP 16) of the grid connection point 5 of the reactive power control device 1C, the voltage (VMP 19) of the bus 19 exceeds the voltage upper limit value (for example, 1.061 PU) as illustrated in FIG. 13($c$). In such a case, since the overvoltage relay of the PCS 20 operates, the reactive power control device of the comparative example is disconnected from the commercial grid 2.

From the above result, it can be understood that the reactive power control device 1C of the embodiment is highly resistant to a voltage variation at the grid connection point 5 as compared with the reactive power control device of the comparative examples.

According to at least one embodiment described above, the reactive power control device derives a limit value of reactive power output, which is output by one or a plurality of power conversion devices, on the basis of a voltage detected by the voltage detector, and adjusts a reactive power command value for the one or plurality of power conversion devices on the basis of a limit value derived by the limit value deriver, so that it is possible to enhance the stability of the operation of the power conversion device.

In addition, in the aforementioned embodiments, the voltage class from the grid connection point 5 to the output terminal of the PCS 20 is set to three stages of 66 kV, 6.6 kV, and 300 V; however, the present disclosure is not limited thereto and is not limited to the number of voltage classes interposed between the grid connection point 5 and the output terminal of the PCS 20. Furthermore, voltage values of voltage classes to be used are also not limited to 66 kV, 6.6 kV, and 300 V described in the embodiment. Furthermore, the voltage class of buses on which the voltage measurement transformers 13 to 15 are installed is also not restricted. Moreover, in the aforementioned embodiments, an example in which the number of the transformers 11 is 1 and the number of the transformers 12 is 4 has been described; however, the number of the transformers and the number of wirings connected to the transformers may be an arbitrary number.

In addition, the aforementioned embodiment has described that the high voltage selector 311 selects the highest voltage from received voltage measurement values as a desired voltage to be set as a limit value; however, voltage measurement values may be received from some or all of the voltage measurement transformers 13 and the highest voltage may be selected from the received voltage measurement values as a desired voltage. Furthermore, the high voltage selector 311 may select the highest voltage from some or all of voltage measurement values, which indicate a relatively high voltage, among the received voltage measurement values as a desired voltage. For example, after a plurality of candidates of the desired voltage value are determined in advance and some voltage measurement values are extracted from the voltage measurement values in a descending order of voltage, a desired voltage corresponding to the extracted voltage measurement values may be selected, or a desired voltage may be determined from a result of a statistical process of an average value, a center value based on a frequency distribution, and the like in a selection process. The low voltage selector 312 may be similar to the high voltage selector 311 described above.

Moreover, in the examples of the aforementioned embodiments, although a device connected to the DC side of the PCS 20 has not been mentioned, various forms such as capacitors, DC transmission lines, and storage batteries may be considered as the device on the DC side of the PCS 20. Particularly, the storage batteries are distributed and installed in units of containers in many cases. Therefore, a reactive power control device connected to the storage batteries is configured with a plurality of transformers and wirings in many cases and is likely to be configured as illustrated in FIG. 1. That is, in the case of a reactive power control device configured by the storage batteries, since an impedance interposed between the grid connection point 5 and the output terminals of the PCSs 20 becomes large, a voltage variation may easily occur on a bus in the device. It is particularly effective to apply the present embodiment to such cases.

Some or all of the functional units of the controller 30 of the first to fourth embodiments described above, for example, are software functional units that are realized when programs (computer programs and software components) stored in a storage unit (a memory and the like) of a computer is executed by a processor (a hardware processor) of the computer. In addition, some or all of the functional units of the controller 30, for example, may be realized by hardware such as a large scale integration (LSI), an application specific integrated circuit (ASIC), and a field-programmable gate array (FPGA), or a combination of the software functional units and the hardware.

So far, although the first to fourth embodiments have been described, the configurations of the embodiments are not limited to the aforementioned examples. For example, the configurations of the first to fourth embodiments may be implemented in combination with one another. For example, the configurations of the second and third embodiments are combined with each other, so that the detection value of the voltage of the measurement point MP 16 may be applied instead of the estimated value of the voltage of the grid connection point 5.

While certain embodiments have been described, these embodiments have been presented by way of example only, and are not intended to limit the scope of the inventions. These embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reactive power control device comprising:
a limit value deriver configured to derive a limit value of reactive power, which is output by one or a plurality of power conversion devices determined for system stabilization and control of a system voltage, on the basis of a voltage of a first point or a second point other than a voltage control target; and
a command value adjuster configured to adjust a reactive power command value for the one or plurality of power conversion devices on the basis of the limit value derived by the limit value deriver,
wherein the limit value deriver derives an estimated value of the voltage of the second point on the basis of the voltage of the first point other than the voltage control target, and derives the limit value on the basis of the voltage of the second point.

2. The reactive power control device according to claim 1, wherein the limit value deriver derives an estimated value of the voltage of the second point on the basis of the voltage of the first point other than the voltage control target and a reactive power amount of the one or plurality of power conversion devices, and derives the limit value on the basis of the estimated value of the voltage of the second point.

3. The reactive power control device according to claim 1, wherein the second point is a point corresponding to a connection point with a grid of an interconnection destination.

4. A reactive power control device comprising:
a limit value deriver configured to derive a limit value of reactive power, which is output by one or a plurality of power conversion devices determined for system stabilization and control of a system voltage, on the basis of a voltage of a first point other than a voltage control target; and
a command value adjuster configured to adjust a reactive power command value for the one or plurality of power conversion devices on the basis of the limit value derived by the limit value deriver,
wherein the limit value deriver derives a first limit value from the voltage of the first point at the output terminal of the power conversion device,
derives an estimated value of a voltage of a second point on the basis of at least the voltage of the first point,
derives a second limit value on the basis of the estimated value of the voltage of the second point, and
derives the limit value from the first limit value or the second limit value.

5. The reactive power control device according to claim 4, wherein the second point is a point corresponding to a connection point with a grid of an interconnection destination.

* * * * *